Jan. 29, 1935.  R. S. PULLEN  1,989,378
HOPPER FOR FEEDING MATCHES
Filed Jan. 19, 1932   6 Sheets-Sheet 1

Jan. 29, 1935.  R. S. PULLEN  1,989,378
HOPPER FOR FEEDING MATCHES
Filed Jan. 19, 1932  6 Sheets-Sheet 2

Witnesses:
Elmer W. Hacker
Geo. E. Jepson

Inventor
Rodney S. Pullen
By Stuelpelen and Son
Attorneys.

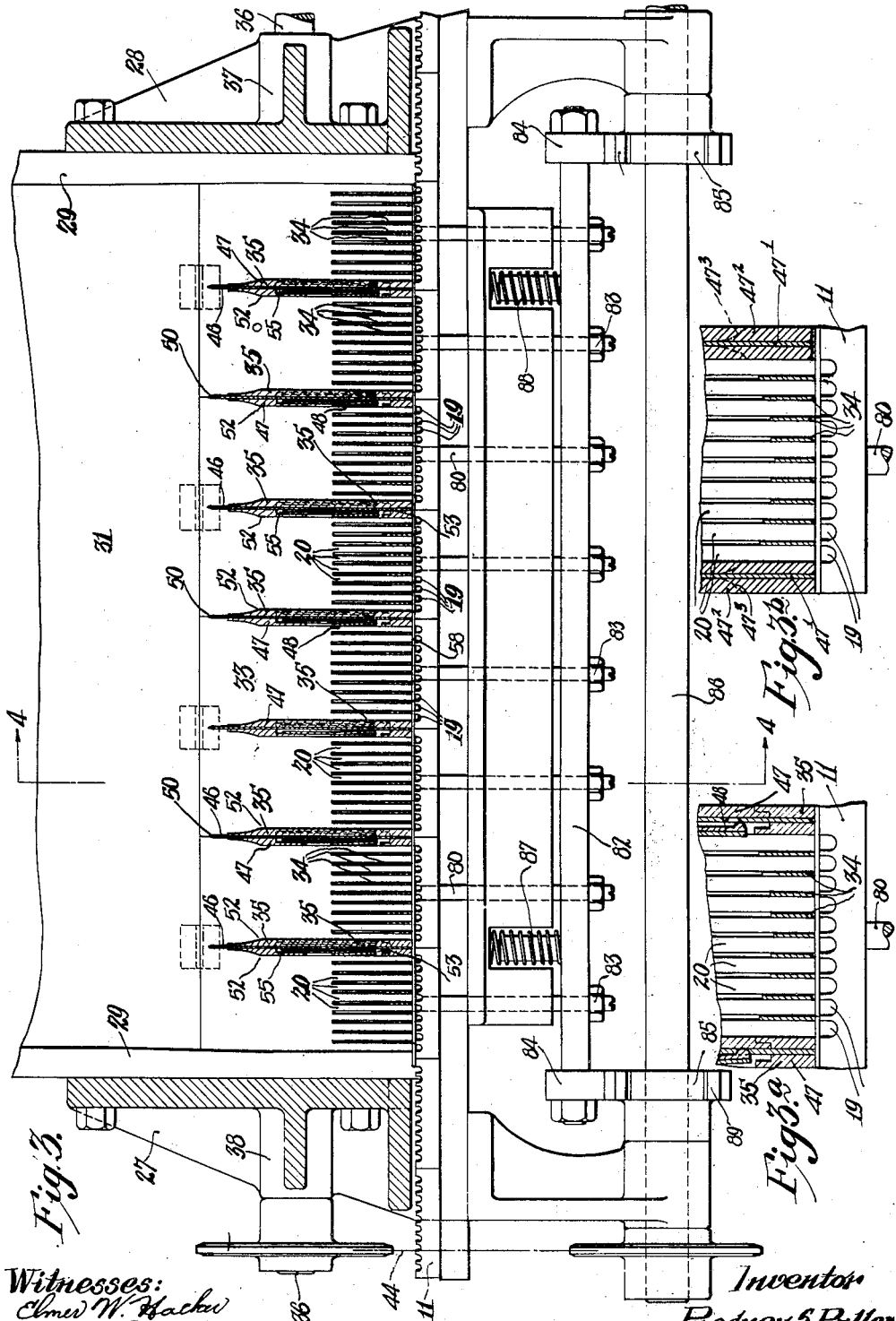

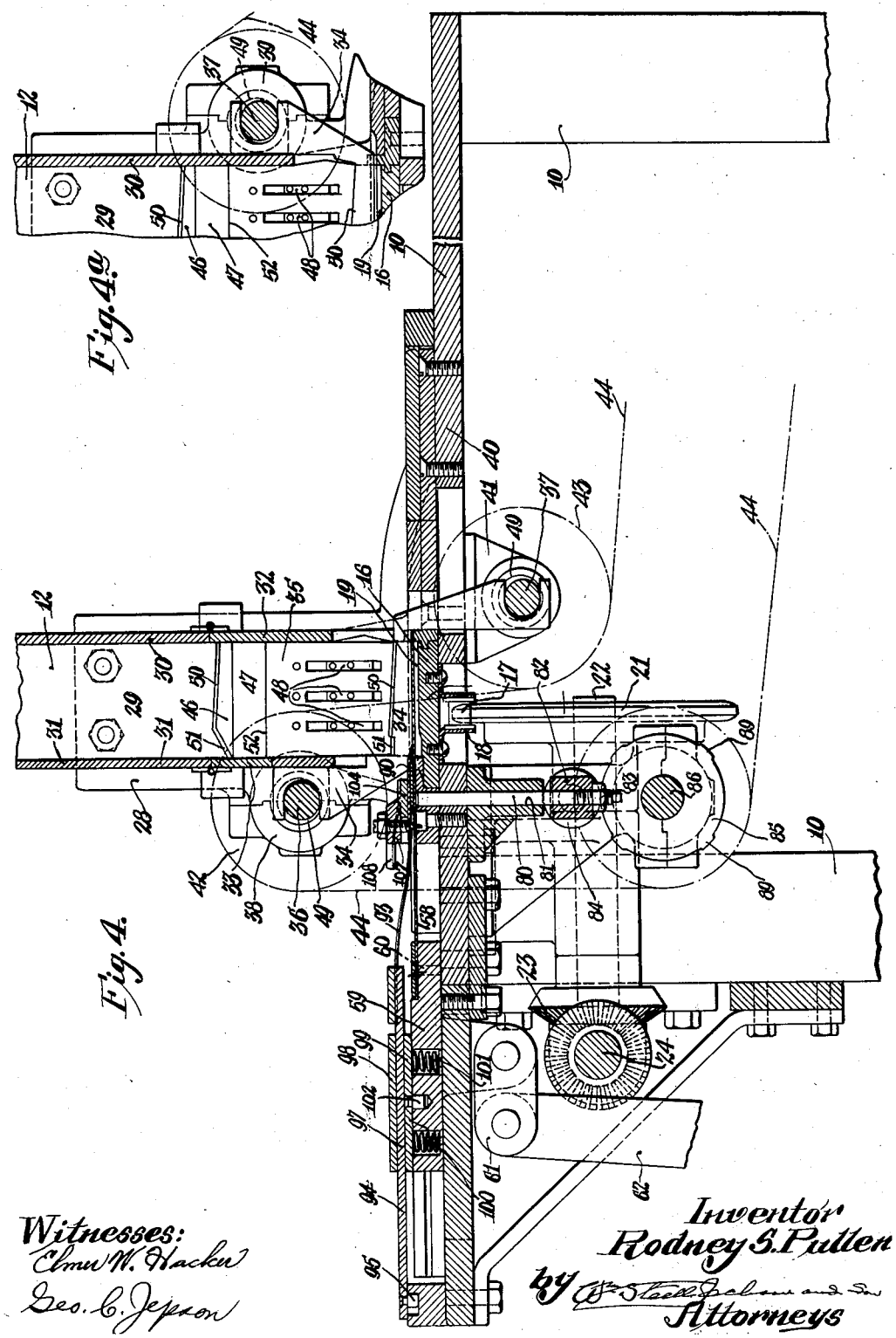

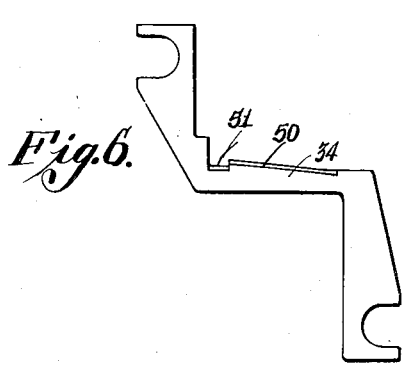
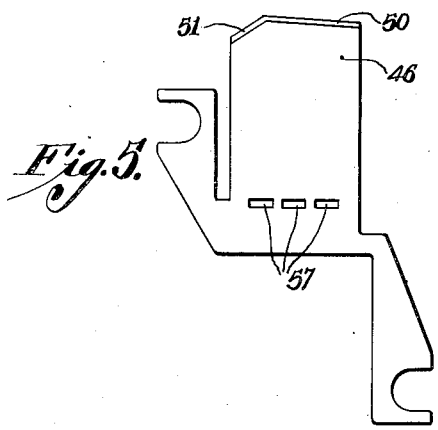
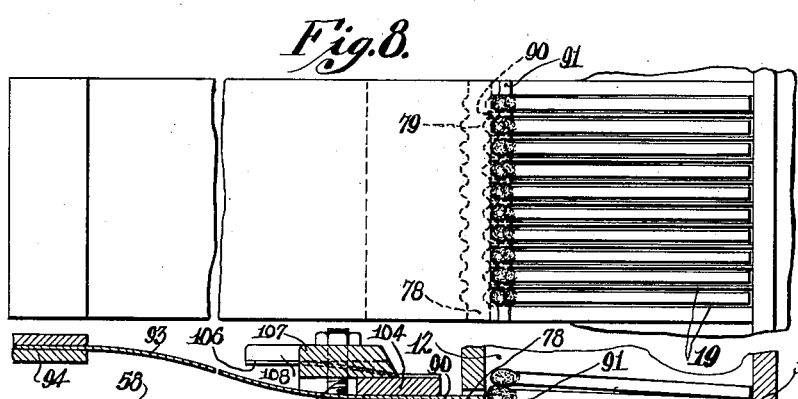
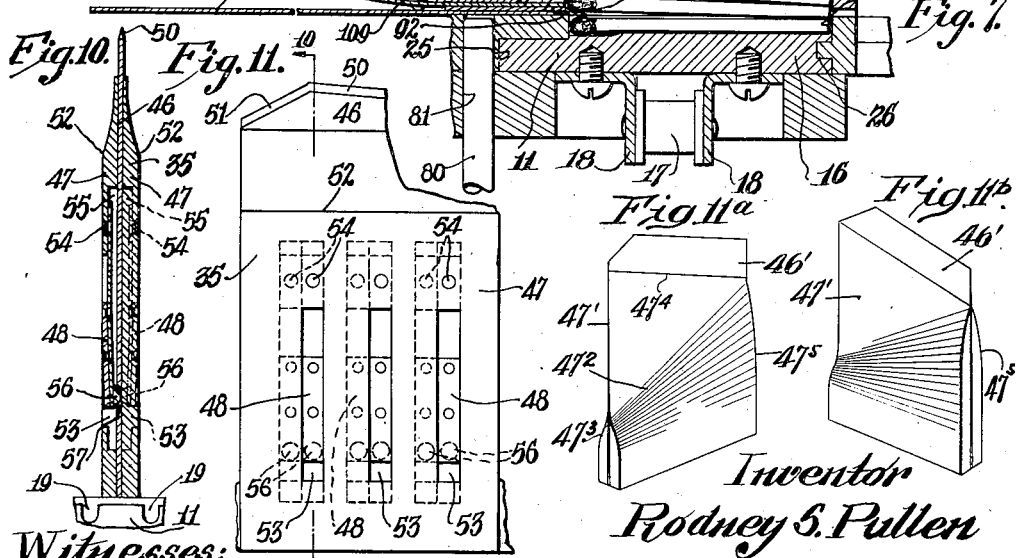

Jan. 29, 1935. R. S. PULLEN 1,989,378
HOPPER FOR FEEDING MATCHES
Filed Jan. 19, 1932 6 Sheets-Sheet 6

Patented Jan. 29, 1935

1,989,378

UNITED STATES PATENT OFFICE 1,989,378

HOPPER FOR FEEDING MATCHES

Rodney S. Pullen, Akron, Ohio, assignor to Pullenlite Company, Philadelphia, Pa., a corporation of Pennsylvania Application January 19, 1932, Serial No. 587,561

29 Claims. (Cl. 226—7)

The invention relates to match feeding mechanism for use in the manufacture of match packets by a match packeting machine or the like and relates more particularly to a match hopper or hoppers, a match conveyor to be fed by matches from the hopper or hoppers and to auxiliary mechanism for securing delivery of matches from the hopper or hoppers into the conveyor.

A purpose of the invention is to provide mechanism of the character indicated adapted to easy and inexpensive manufacture and well suited to the needs of service.

A further purpose is to use alternately a horizontal slide plate and successive portions of an endless conveyor as a bottom closure for a match hopper.

A further purpose is to register the successive sections of a multiple match hopper directly above successive carrier blocks of a conveyor along one portion of the conveyor length, registering upwardly directed transverse groove seats for individual matches of the conveyor with downwardly directed one-match width divisions of the hopper sections, adapting the bottom matches of the hopper divisions during each rest period of the conveyor to be charged simultaneously downwardly to the groove seats of the conveyor blocks registering under the hopper during the rest period.

The term "one-match width" applied in the specification and claims to the bottom divisions of the hopper and to match seats on the conveyor is intended to mean a width too narrow for more than one match side by side and sufficiently wide for the free movements of individual matches.

A further purpose is to prevent downward movement of the matches from a match hopper above an intermittently movable conveyor during the advance of the conveyor by inserting a plate between the conveyor and hopper preparatory to the advance of the conveyor, retracting the plate when the conveyor comes again to rest in order to permit downward delivery of the matches from the hopper into individual groove seats of the conveyor.

A further purpose is to provide a particularly efficient form of horizontal slide plate for separating matches seated in the transverse groove seats of conveyor sections beneath a hopper from the overlying matches in the bottom of the hopper.

A further purpose is to provide the individual sections of a match hopper of the character indicated with preferably individual horizontal plates adapted to slide horizontally between matches delivered to the sections of a conveyor in rest below the corresponding sections of the hopper and overlying matches inside the hopper and to preferably vertically vibrate the horizontal slide plates during the entry of the plates to the space between the matches of the conveyor and those in the hopper.

A further purpose is to upwardly extend that portion of the division edge of a match division plate which is near to but not at a point to register with match head ends of the progressively downwardly approaching matches about to be separated by the plate.

A further purpose is to use the more definite vertical spacing between matches at their match head ends incident to the match heads and as compared to the spacing between the matches at their shank ends to effect more certain entry of a horizontal slide plate between the matches above and below the plate.

A further purpose is to provide novel and efficient mechanism for guiding the matches within a hopper of the character indicated near the bottom thereof into individual groove seats presented by a conveyor directly beneath the hopper.

A further purpose is to vertically oscillate vertical division walls of a hopper of the character indicated in order to effect more efficient downward delivery of the matches into and from one-match width spaces between the walls and to preferably reciprocate the successive division walls in continuously opposite directions, moving one wall up while the walls of adjacent divisions move down, and vice versa.

A further purpose is to provide a wall between the divisions of a hopper of the character indicated with a contour along its upper edge adapting the wall to first engage downwardly feeding matches at points near their match head ends while still lower than the matches at their shank ends, thereby effecting easier and better separation and guiding of the matches to the adjacent spaces on either side of the division walls.

A further purpose is to combine match feeding devices relatively spaced along an intermittently movable match conveyor with a suction broken-match eliminator at a portion of the conveyor intermediate the devices, using the first feed device for charging successive portions of the conveyor with matches, the suction device for eliminating any broken matches among those charged and the second feed device for feeding fresh matches into the empty spaces.

Further purposes will appear in the specification and in the claims.

I have elected to show one only of the different main forms of my invention, showing however a detail modification thereof and selecting a main form and detail modification thereof that are practical and efficient in operation and which well illustrate the principles involved and showing the main form as part of a match packeting machine, not shown in detail further than that needed to illustrate the present invention.

Figure 3 is a fragment of Figure 1 to enlarged scale.

Figures 3a and 3b are fragmentary elevations of modified forms of Figure 3.

Figure 4 is a section of Figure 3, taken upon the line 4—4 thereof.

Figure 4a is a modified fragment of Figure 4.

Figures 5 and 6 are side views of details comprising vertically movable plates, respectively a movable plate portion of a composite division wall between adjacent main hopper sections and a division wall between adjacent one-match divisions of the main hopper.

Figures 7 and 8 are enlarged fragmentary views, plan and side elevations respectively, of the same structure and illustrating the entry of a horizontal cut-off plate between matches seated in the groove seats of the conveyor and the overlying matches in the one-match width divisions of the hopper near the bottom thereof.

Figure 10 is a vertical section of a detail, corresponding to a section on the line 10—10 of Figure 11.

Figure 11 is a fragmentary side view of the detail shown in Figure 10.

Figures 11a and 11b are perspective views of modified forms of Figure 11.

Like numerals refer to like parts in all figures.

Figure 1:
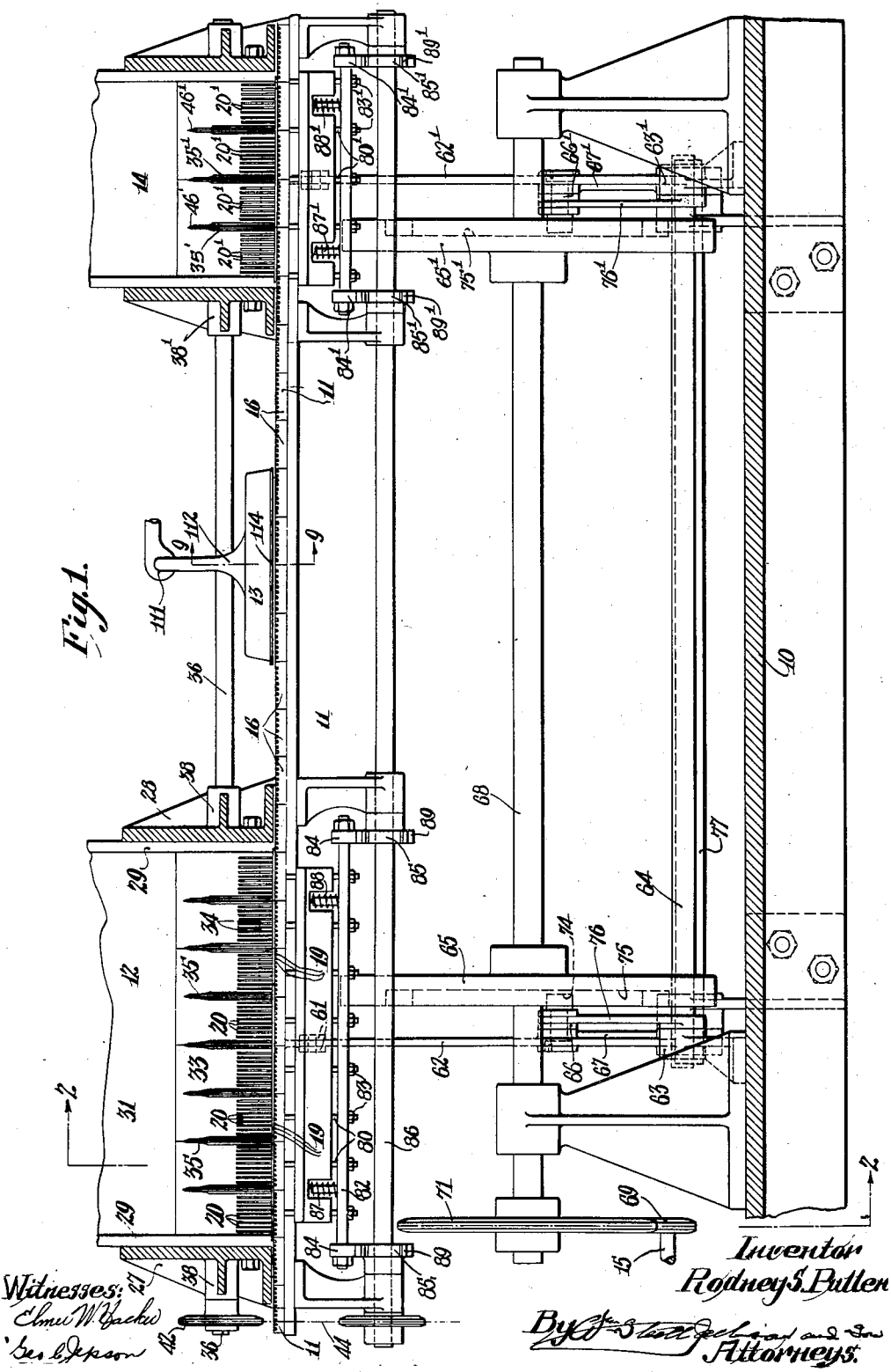
Figure 1 is a fragmentary longitudinal elevation of mechanism embodying a desirable form of the present invention, the view being partially diagrammatic, the view being in part section.
Figure 2:
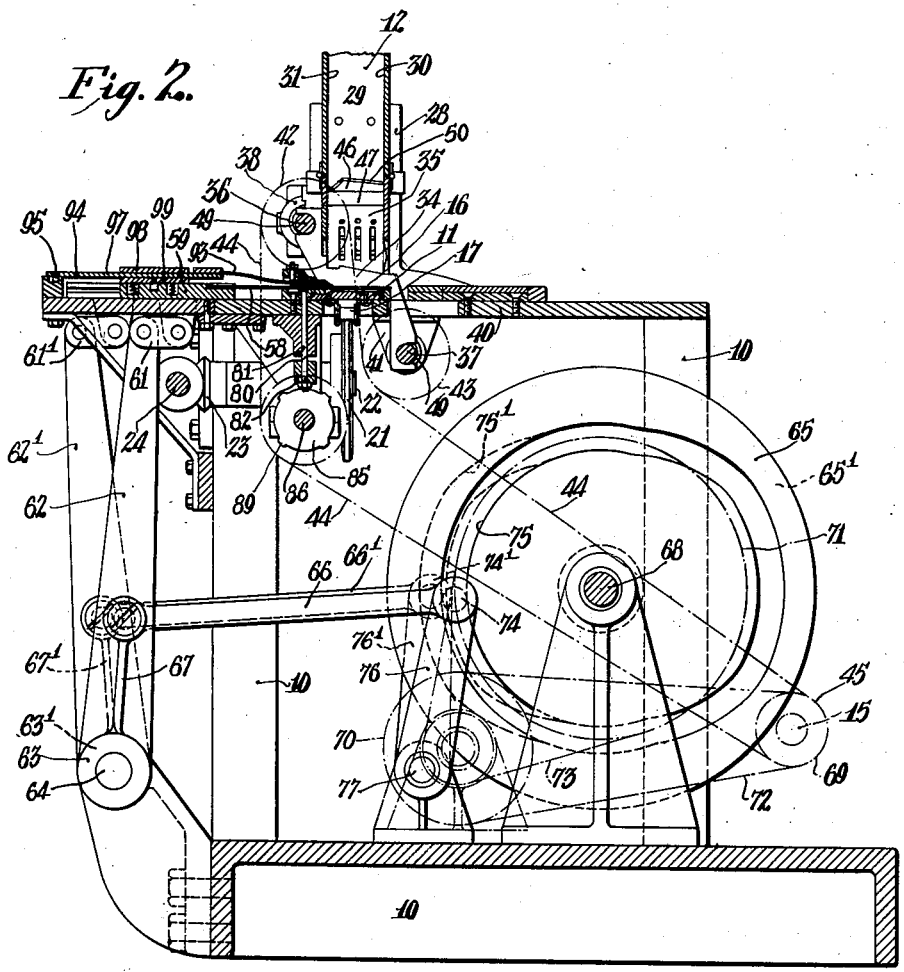
Figure 2 is a vertical section of Figure 1 taken upon the line 2—2 thereof.
Figure 9:
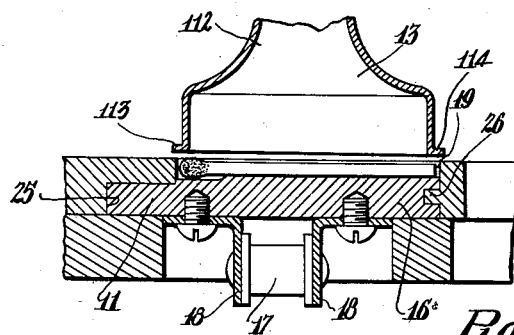
Figure 9 is a fragmentary vertical section taken upon the line 9—9 of Figure 1, illustrating suction mechanism for eliminating any broken matches from the conveyor.
Figure 12:
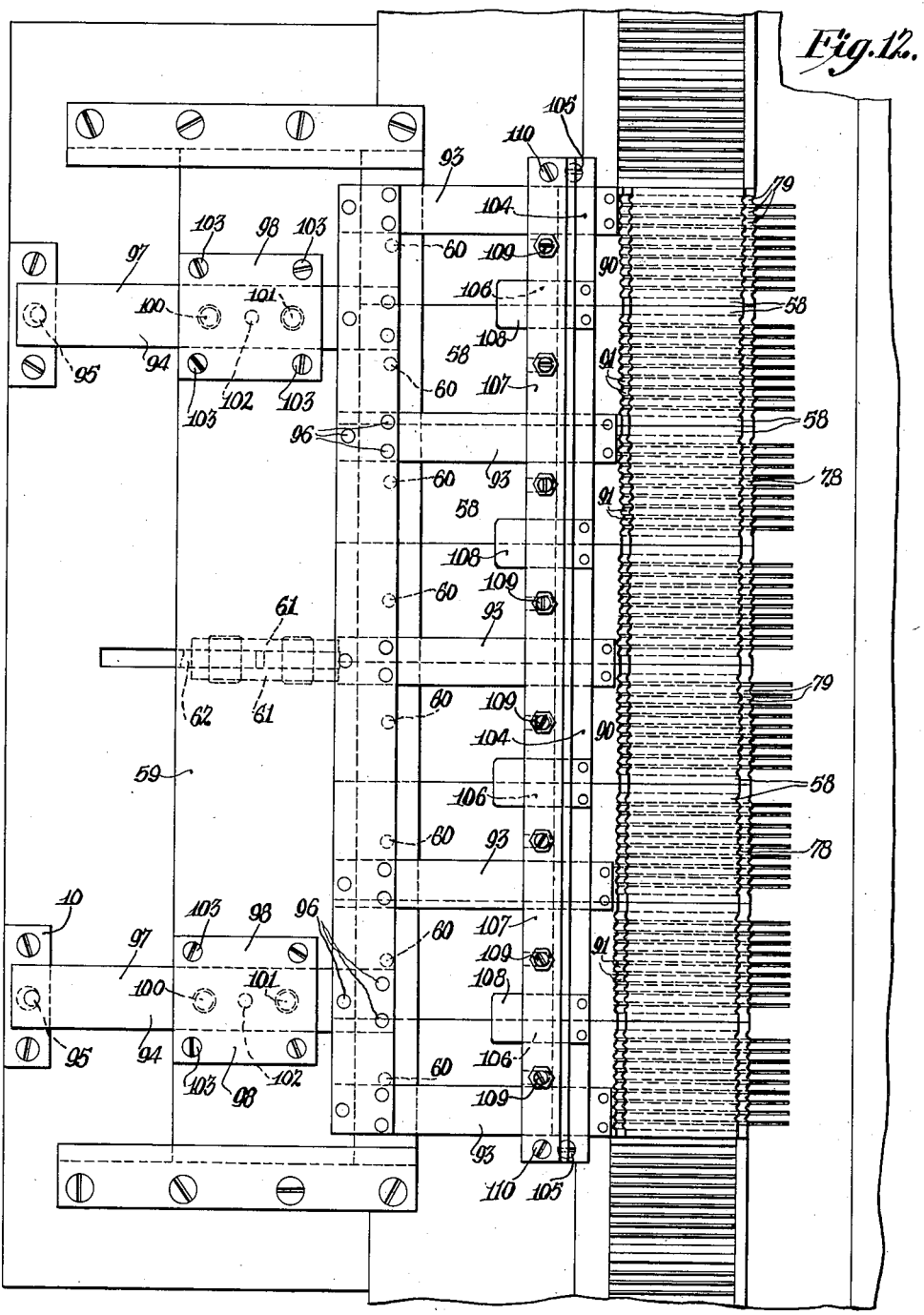
Figure 12 is a top plan view of structure shown in Figure 7 but with the hopper removed.

Describing in illustration and not in limitation and referring to the drawings:—

In the illustration a fragment of the stationary frame structure of a match packeting machine or the like is illustrated at 10, the packeting machine or the like comprising any mechanism to which the present invention is adapted to be applied.

The stationary structure 10 supports an intermittently movable endless conveyor 11 for delivering matches to match packeting mechanism of the machine, and spaced along and directly above successive portions of the conveyor supports a match hopper 12, a broken match eliminator 13 and an auxiliary hopper 14.

The stationary structure 10 also supports mechanisms for assisting the feed of matches out of the hoppers into groove seats of the conveyor and for closing the conveyor from the hoppers during the forward movements of the conveyor.

Successive portions of the conveyor come to rest with or without one or more intermediate position or positions of rest successively in a match receiving position directly under the main hopper 12, beneath the broken match eliminator 13, beneath the auxiliary or replacement hopper 14 and then into a discharge position at which the loaded matches are removed from the conveyor by the match packeting mechanism.

As illustrated the main hopper 12 comprises eight successively adjacent major divisions to cover simultaneously eight successive blocks of the conveyor.

The broken match eliminator 13 and the replacement hopper 14 spaced successively along the conveyor from the main hopper are shown each half as long as the main hopper, each covering and registering directly over four successive sections of the conveyor during each rest period of the conveyor.

Both hoppers 12 and 14 are shown divided into major divisions of length equal to the length of the conveyor blocks, and subdivided into divisions of one match width that register directly above one match width groove seats on the individual conveyor blocks.

The conveyor advances in intermittent steps, each step comprising preferably a distance equal to the length of the replacement hopper 14, illustrated as the length of four blocks of the conveyor.

When the main hopper is twice as long as the auxiliary hopper, its length is thus equal to two step movements of the conveyor so that in the illustration the individual blocks of the conveyor are each time completely under the main hopper throughout a period of conveyor rest, a period of conveyor movement and a second period of conveyor rest, and are subsequently completely under the broken match eliminator and under the auxiliary hopper during single periods of conveyor rest.

Obviously the number of sections in the replacement hopper may be made the same as the number of sections in the main hopper and in this event, the advance of the conveyor may suitably comprise a forward step equal to the length of the conveyor portion under the main hopper.

The endless conveyor is suitably operatively connected to the main drive shaft 15 of the packeting machine and includes a succession of similar blocks 16 upon similar links 17, each block 16 being rigidly carried upon one of the links 17 by brackets 18 and presenting when in rest beneath the hopper, a succession of transverse groove match seats 19 to register with vertical divisions 20 of one of the hopper sections.

The conveyor links may pass over suitable sprocket wheels at opposite ends of the conveyor in any usual or suitable way.

One of these wheels is indicated at 21 rigidly fastened upon a shaft 22 that is journaled in the stationary structure and makes a bevel gear connection at 23 with a shaft 24 intermittently driven from the main drive 15 of the packeting machine in any suitable way, not shown.

Each advance of the conveyor may equal in distance the length of the auxiliary or replacement hopper 14, in the illustration the length being that of four blocks of the conveyor, the packeting machine normally making either a multi-match packet of four sections or simultaneously four separate match packets.

The blocks are shown as horizontally guided by tongue and groove guiding connections at 25 and 26 with the stationary structure. Mechanism for exactly registering the rest positions of the conveyor in order to adapt the sections to present their grooves in exact registry with corresponding one-match width divisions of the hopper has not been shown, but may comprise any suitable or usual mechanism for securing proper close registry.

The hopper 12 has a width in a direction transverse to the travel of the conveyor such that it loosely fits the length of the matches. The hopper 12 is shown supported upon end brackets 27 and 28 that are carried upon the stationary structure of the machine.

The brackets 27 and 28 carry the end plates 29 of the multi-hopper, the end plates in turn carrying the sides, which extend across the ends of the matches and parallel to and on opposite sides of the path of movement of the conveyor.

The front and rear sides include raised plates 30 and 31 rigidly fastened at opposite ends to the brackets 27 and 28 and doors 32 and 33 hinged to the lower edges of the plates 30 and 31, which open to permit easy access into the subdivisions of the hopper.

The upper portion of the hopper has been broken away in that it does not in itself form part of the present invention.

The upper portion of the hopper may be from end to end without division walls longitudinally of the matches. Toward the bottom the hopper is divided longitudinally of the matches by walls 34 and 35 into guiding vertical divisions 20 of one-match width, the relatively high walls 35 dividing the hopper into the major divisions for the individual blocks of the conveyor and the walls 34 subdividing the major divisions into subdivisions of one-match width above the individual groove seats 19 of the conveyor blocks.

The division walls 34 preferably comprise vertically vibrating vertical plates.

As illustrated these plates are supported at opposite ends outside the hopper upon a succession of cams or eccentrics spaced along suitable shafts 36 and 37, the shafts being suitably alike and parallel to and respectively to the rear and to the front of the hoppers.

The shaft 36 is suitably supported along the rearward sides of the hoppers in cap bearings 38. The shaft 37 may be supported along the front sides of the hoppers, in cap bearings 39 as indicated in Figure 4a or in order to be better out of the way of the doors along the fronts of the hoppers may be located below a floor portion 40 of the stationary frame 10, being shown supported from the under side of the floor in cap bearings 41.

The shafts 36 and 37 carry sprocket sheels 42 and 43 to be continuously rotated by a suitable chain 44 driven from a sprocket 45 on the drive shaft 15 of the machine.

Figures 3a and 3b differ from the structure in Figure 3 in the generally curved arrangement of the reciprocating division plates 34′, low in the center and higher at the sides. Alternate plates 34² are shown as relatively slightly higher than the intermediate plates. Good results which have been secured for example, from a difference in height as small as 1/20 of an inch.

In Figure 3a the partition or division walls are those of Figure 3, while in Figure 3b the partition or division walls are those shown in Figures 11a and 11b.

The division walls 35 between the successive major hopper sections are relatively thick as compared to division plates 34 which subdivide the hopper major sections near the bottom of the hopper into the divisions 20 of one-match width.

The division walls 35 are desirably composite members that effect vertical and lateral agitation of the matches respectively above the division walls 35 and at the sides thereof, preferably at an elevation a little above that of the tops of the walls 34.

As shown the composite walls 35 include a vertically movable plate 46, stationary plates 47 and lateral agitators 48.

The members 34 and 46 are conveniently supported in the same way upon groove cams 49 spaced along the shafts 36 and 37 and at their sides and lower portions may be alike (Figures 6 and 5). They may be of quite light gauge, are vertically guided in slots in the sides of the hopper and vertically reciprocated by the cams on the shafts 36 and 37.

The cams 49 may suitably comprise merely grooves eccentrically turned on the shaft so that rotation of the shaft vertically reciprocates the plates.

Preferably the grooves 49 are of alternately reverse eccentricities making the successive plates move in reverse directions, each plate moving upwardly while the plates on either side of it are moving downwardly and vice versa.

The bottoms of the one-match divisions of the hopper exactly register with the groove seats 19 of the conveyor sections when the conveyor is in dwell.

One feature of the invention is directed to the form of the upwardly directed dividing edges of the division plates. These upwardly directed dividing edges are preferably sharp along their full lengths, as indicated at 50 and the edges slope upwardly toward the match-head ends of the matches but preferably have a downward slope near but somewhat away from the match heads as indicated at 51.

The upward slope of the division edges of the division plates is preferably made somewhat greater than the slope of the adjacent matches at these edges, and as a result the upwardly directed vertical corners at 51 near the match head ends are the first portions of the plates to enter the spaces between overlying adjacent matches during the upward movements of the plates and the downward settling of the matches, thereby effecting a more easy and gradual progressive separation of the overlying matches so as to guide them to the division spaces upon opposite sides of the plates.

The vertically oscillating plates 46 (Figures 5, 10 and 11) extend upwardly some distance beyond the tops of the stationary plates 47, the latter plates being preferably relieved as indicated at 52 for more easy downward passage of the matches.

The lateral agitators 48 operates on each side of the plate 46 in vertical slots 53 of the plates 47, the agitators on one side of the plate 46 being preferably staggered with respect to those on the other side thereof.

Each agitator 48 includes a spring fastened at its upper end at 54 to one of the plates 47 in a suitable recess 55 thereof, carries a body plate loosely fitting one of the slots 53 and presses an inwardly directed toe 56 upon the plate 46. The plate 46 is perforated at 57 to receive the toes 56 at one vertical position of the plate 46 and to express the toes outwardly when the plate moves out of this position.

It will be seen that the agitators 48 spring inwardly each time vertical movement of the plates 46 brings the perforations 57 in registry with the toes and are forced outwardly each time vertical movement of the plates 46 carries their perforations away from the toes 56.

Desirably the same contour is provided for the upwardly directed dividing edges of division plates 46 as for the dividing edges of the plates 34, except that the slopes of the upper edges of the higher walls 35 should be greater than the corresponding slope of the lower walls 34 in that the slope of the matches progressively increases from the bottom of the hopper upwardly.

In Figures 11a and 11b the steel partition sheet 46' is sheathed on opposite sides by two brass sides 47' which curve forwardly and upwardly as seen at $47^2$ from the edge $47^3$ and terminate at $47^4$. The front wall $47^5$ shows as a curved wall in Figure 11a because of the swell of the metal.

The partition moves in its entirety and its wedge action prevents forming out of the stick ends of the matches.

The closure across the bottoms of the hopper divisions 20 is alternately the groove seats 19 of the conveyor blocks and the top of a horizontally movable cut-off plate or shutter 58.

The plate 58 is adapted to slide in and out longitudinally of the matches between the bottom of the hopper and the blocks of the conveyor. It is moved in preparatory to an advance of the conveyor separating overlying matches of the downwardly directed division spaces 20 of the hopper from the conveyor blocks and the underlying matches thereon and is retracted after the conveyor has come to rest preparatory to the downward delivery of matches out of the hopper into groove seats 19 of the conveyor.

As illustrated, a horizontally guided slide plate 59 extending the length of the multiple hopper carries the very thin cut-off plates 58 rigidly fastened to it at 60 and is adapted to be horizontally reciprocated by a link 61 and rocker arm 62.

The rocker arm is mounted on a sleeve or hub 63 and angularly reciprocated about a journaling shaft 64 by mechanism operatively connected to the main drive shaft 15 of the packeting machine.

This mechanism includes a face cam 65, a link 66 and an arm 67, the arms 62 and 67 being both rigidly fastened to the hub or sleeve 63 and forming therewith a single rocker unit journaling on the stationary shaft 64 and reciprocated by the link 66.

The cam 65 is mounted upon a shaft 68, rotated from the main drive shaft at suitably reduced speed by sprockets 69, 70 and 71 and intermediate sprocket chains 72 and 73.

The link 66 presents a suitable roller 74 in a groove slot 75 of the cam 65 and is supported from angular movement at the cam by a rocker guide 76 pivoted upon a stud shaft 77.

It will be understood that the cut-off plates 58 enter the space immediately beneath the hopper division walls 34 at the side of the hopper adjacent the match-head ends of the matches.

As a result of the stick portions of the matches being already slightly spaced from one another by the match heads the entry of the cut-off plates is more easy than would be the case if the shutter plates entered at the stick ends of the matches.

The forwardly directed division edges of the cut-off plates 58 are formed for easy lifting of the overlying matches from the matches in the groove seats of the conveyor blocks, being serrated and relieved forwardly and downwardly at 78, with the serrations located to bring the recessed portions 79 thereof in alinement with the matches.

Preferably the cut-off plates 58 are of very thin resilient sheet material and made individual to the hopper sections, each section being provided with one plate 58 and means is provided for vertically vibrating the plates 58 during the moment of plate entry, each plate being provided with a vibrator rod 80 adapted to vertically vibrate the plate as the plate enters between the matches and in a way that insures more easy entry of the plate.

As illustrated, the vibrator rods 80 are vertically guided at 81 in stationary structure and adjustably thread through a square bar 82, lock nuts 83 being provided to hold the rods in their set positions.

The ends of the bar 82 are shown turned round to receive rollers 84 that are presented downwardly against cam wheels 85, which are mounted upon a common shaft 86 that suitably is driven by the same sprocket chain 44 that operates the vertically jigging movement of the division plates 34 and 46.

The square bar 82 carrying the vibrator bars is suitably spring pressed downwardly near opposite ends at 87 and 88 to maintain the rollers upon the ends of the shaft in continuous contact with the cam wheels.

It will be understood that the cam wheels are provided with suitable projections as at 89 to provide the vibrator rods with a vertical vibration synchronized to assure easy entry of the cut-off plates between the overlying matches of the hopper and the underlying matches of the blocks, the "underlying" and "overlying" matches being respectively those seated in the one-match wide grooves of the conveyor blocks and the matches in the one-match wide divisions 20 of the hopper directly above the groove seats of the conveyor blocks.

In order to provide a more sure and easy entry of the shutter plate into a separating line between the underlying and overlying matches I preferably provide means for slightly raising the head ends of the overlying matches preparatory to the entry of the forward edge of the shutter plate.

As illustrated this includes a match lifter plate 90, that is wholly above the shutter plate when the shutter is in its advanced position at which it closes the bottom of the hopper from the conveyor blocks, and that forwardly overlaps the shutter when the shutter is in its retracted position.

The plate 90 has a very short range of longitudinal movement as compared to that of the shutter, and when both plates are in their retracted positions the plate 90 presents a downwardly stepped portion 91 to project forwardly beyond the edge of the shutter plate and in the plane of the shutter.

The downwardly stepped portion 91 of the lifter plate enters into engagement with the matches, at the heads thereof in the plane of the shutter and ahead of the shutter, then coming to rest with respect to longitudinal movement to be raised with a corresponding lifting of the engaged head ends of the matches preferably by the inwardly moving shutter, the lifting of the head ends of the matches permitting a free entry of the forward edge of the shutter.

The shutter plate 58, continuing on its inward stroke longitudinally of the matches comes to rest in a position to effectively close the bottom of the hopper from the conveyor, permitting the conveyor to then move forwardly without an interfering engagement between the matches of the conveyor and those of the hopper.

The forward edge of the lifter plate is preferably forwardly and downwardly relieved the same as the shutter plate, and also preferably serrated as already described for the shutter plate.

The step 92 along the rear of the leading portion 91 of the lifter plate is suitably equal to the thickness of the shutter in order that the lifter may enter into engagement with the match heads in the line of movement of the shutter.

The horizontal travel of the lifter plate 90 is suitably effected by providing a friction connection between the lifter and shutter members, with a limiting of the travel of the lifter plate to the desired short range—the lifter plate moving forward along its range of longitudinal movement at the beginning of each forward stroke of the shutter and retracting along its range of longitudinal movement at the beginning of each retracting stroke of the shutter.

As illustrated, the stepped plate 90 is operatively connected by laterally spaced springs 93 to a slide 94 that is provided with a limited freedom of movement in a direction longitudinal of the movement of the shutter plate by a slot and pin connection 95 with stationary structure 10 of the machine.

The slide 94 is guided to longitudinal movement and is provided with a frictional engagement with the slide plate 59 carrying the shutter 58.

As illustrated (Figures 2, 4, 7 and 12) the slide 94 comprises a cross bar fastened at 96 to the outer ends of the springs 93 and spaced slide bars 97 which have the slot and pin connections 95 with the stationary structure and also have guiding and frictional engagements at 98 with the slide 59 carrying the shutter.

The frictional engagements between the two slides 59 and 94 is at the slide bars 97 of the slide 94. Guide plates 98 and 99 carried by the slide plate 59 are respectively above and below the bars 97, the plates 99 being spring pressed upwardly from the slide 59 at 100 and 101 and having loose pin and socket connections at 102 with the slide plate 59.

The plates 98 are rigidly fastened at 103 to the slide 59, and both plates 98 and 99 travel with the slide 59, thereby pulling the slide 94 along whenever the latter slide is free to move.

As illustrated, the lifter plate 90 and the forward ends of the springs 93 are held down to their horizontal alinement by a transverse stationary bar 104 which is fastened at the ends at 105 to the stationary structure and carries at spaced intervals of its length springs 106 for use in maintaining a second transverse bar 107 in place, the springs 106 carrying upwardly projecting members 108 in front of the bar 107.

The bar 107 carries a series of adjustable screws 109 that project downwardly to limit the upward movement of the shutter plate or plate 58. Preferably the shutter plates 58 while operating horizontally as a unit are separate intermediate the hopper divisions against an upward retraction of the springs 93. There is one of these screws for each shutter plate and therefore for each of the hopper sections. The transverse bar 107 may be fastened to the stationary structure at the ends as at 110.

The screws 109 provide means for easy individual adjustments of the shutter portions under the individual hopper sections which has been found to be desirable in view of the individual vertical vibration of these plates by the vibrator rods 80.

In view of a lack of uniformity of usual commercial matches intended to be operated upon at the hopper it has been found that precautions are desirable in order to insure that each groove seat of each conveyor block shall contain a whole match when the conveyor block is positioned for delivery of its charge to the packeting machine.

This involves a removal from the conveyor of any broken matches received from the multiple hopper and thereafter an insertion of matches into any inadvertently empty seats of the conveyor block, such seats being empty of matches by reason of any miss deliveries or/and broken match deliveries from the main hopper preparatory to the block reaching its match delivery position at the packeting machine.

I therefore provide mechanism at 13 operative at the conveyor blocks after they pass the main hopper for picking out any broken matches and mechanism at 14 operative at the conveyor blocks after they have progressed beyond the broken match picker to charge any unfilled seats of the blocks before the blocks reach their match delivery positions.

The mechanism for delivering the matches into the grooved seats of the conveyor from the multiple hopper may be operated at widely different speeds.

At low speeds the delivery from the hopper into the block sections of the conveyor should be perfect except with respect to any broken matches which when present will be usually individually delivered into groove seats of the conveyor that would have received whole matches had the broken matches not been present. Usually the broken matches are infrequent but when present usually need to be picked off the conveyor whatever the speed of operation of the match delivery.

If the speed of operation be progressively increased a point will be finally reached at which there will be occasional misses in the delivery of matches out of the one-match width spaces at the bottom of the hopper into the one-match width spaces of the conveyor and in practice it may be economical to run the mechanism at the main hopper at this high speed as I find that the misses of delivery from the main hopper are readily taken care of at an auxiliary hopper 14 placed subsequently to picker mechanism 13 and before the positions at which the matches are delivered out of the conveyor by the match packeting mechanism.

The high speed operation at the main hopper and the automatic taking care of any misses that would not be present if the mechanism were operated at lower speed, permits higher speed in the operation of the packeting machine and the combination that permits this is one of the advantages of the present mechanism, the combination of main hopper and auxiliary hopper in series permitting a great increase in the speed of operation of the packeting machine beyond that possible with a single hopper.

The picker mechanism 13 suitably comprises a suction hood directed downwardly over the conveyor at a position intermediate the main and auxiliary hoppers.

The hood may be provided with suction in any suitable way, indicated diagrammatically as by means of a fan 111, having suction inlet 112 connected to the hood. The front and rear sides 113 and 114 of the hood overlap respectively opposite ends of the underlying groove seats of the conveyor blocks, thereby overlapping corresponding opposite ends of the matches in the groove seats, the side 114 being thus directly above the stick ends thereof. The air enters the suction hood strongly under the sides of the hood at the opposite ends of the grooves.

Any substantial movement of the whole matches is prevented, the matches being caged in every direction, unable to move longitudinally in that the ends of the grooves are closed by the stationary guide structure adjacent the conveyor and prevented from moving upwardly into the hood at either end by the overlapping sides of the hood.

Any broken match being materially shorter than its groove seat cannot be caged within its seat 19 and is drawn up by the suction into the hood.

I prefer to make the hood of length along the conveyor equal to the length of each forward step movement of the conveyor, intended to be equal to the length of four blocks in the illustration, though obviously subject to any selected different length.

I also preferably locate the hood to exactly register with the conveyor blocks at dwell in that the suction for assured effective action of the hood need be less when this is done.

The auxiliary hopper 14 is suitably substantially similar to the main hopper 12 except that in view of the fact that nearly all of the matches come from the main hopper and usually very few indeed from the auxiliary hopper and the mechanism for delivering matches out of the bottom of this hopper on to the conveyor into any unfilled one-match width groove seats of the conveyor, the latter hopper need have a relatively small depth as compared to the depth of the main hopper.

The auxiliary hopper preferably should have a length longitudinally of the conveyor equal to the length of advance of the conveyor during each forward step thereof.

In the illustrated mechanism this advance is assumed to be equal to the length of four blocks of the conveyor so that the auxiliary hopper in a direction longitudinally of the conveyor covers four blocks of the conveyor, and the conveyor is located in a position to present its one match width divisions 20' during each rest period of the conveyor to register directly above the one-match width divisions on four of the conveyor blocks.

The shutter mechanism, the means for lifting the head ends of the matches preparatory to the entry of the shutter, for vibrating the division walls of the auxiliary hopper may all be as already described for the main hopper and the corresponding parts are therefore correspondingly lettered, using primes to designate the mechanism of the auxiliary shutter, the description of the mechanism at the main hopper reading also on the corresponding mechanism at the auxiliary hopper.

The one difference at the two hoppers relates to the number of reciprocations of the shutter.

In view of the fact that the main hopper covers twice as many sections of the conveyor and as covered by the auxiliary hopper, it will be seen that the reciprocations of the shutter of the auxiliary hopper should be twice as many as those of the shutter of the main hopper.

The shutter mechanisms are shown as being operated by cams 65 and 65', both on the shaft 68, the cam 65 of the main hopper shutter being formed to give only half as many longitudinal reciprocations to the link 66 as is given by the cam 65' to the link 66'.

The rockers 62, 63, and 67 of the main hopper and the corresponding rockers 62', 63' and 67' of the auxiliary hopper are loosely mounted upon the common shaft 64.

Suitably the mechanism for vibrating the shutters and for vibrating the vertical partition walls of the two hoppers may be operated simultaneously by the same members as clearly indicated in Figure 1.

Following the operation through a complete cycle and starting with the conveyor ready to move forward, the conveyor is presenting eight blocks A of its length under the main hopper, four blocks B in a more advanced position under the broken match eliminator, four other blocks C still further advanced under the auxiliary hopper, and usually four other blocks D still further advanced in a match discharge position.

At the start of the cycle the blocks D are assumed empty of matches, any match discharge mechanism (not shown in that it in itself forms no part of the present invention) having retracted out of the groove seats of the matches leaving the conveyor free to advance.

The rearward four of the eight blocks A are at this time empty of matches and the remaining and forward blocks thereof are normally at this time completely charged with matches, with possibly one or more of the matches broken, and with a possibility also, particularly if the cycle is being repeated very rapidly, of one or more empty match seats from one or more miss deliveries from the main hopper.

The four blocks B under the broken match eliminator will at this time normally also be completely charged with matches, but with perhaps one or more empty match seats by reason of an elimination of any broken matches—or/and any miss deliveries from the main hopper during an earlier rest period of the conveyor.

The four blocks C at the auxiliary hopper will at this time be completely charged with matches in that any spaces empty when the conveyor last came to rest will have been charged from the auxiliary hopper.

The conveyor now advances one step, assumed to be a distance equal to the length of the four blocks. During the advancing movement the shutter members both at the main hopper and at the auxiliary hopper remain across the bottoms of the respective hoppers, being preferably continuously vibrating to promote rapid downward match delivery into the one-match groove division spaces 20 above the shutter plates.

At the end of the advance of the conveyor the conveyor will be presenting eight empty blocks under the main hopper, four advanced blocks normally completely charged with matches under the eliminator and four more advanced blocks under the auxiliary hopper.

As soon as the conveyor comes to rest, both shutter plates retract. The retraction of the shutter at the main hopper permits a downward feed of matches from the hopper into the groove seats of the eight empty blocks than under the main hopper.

Any broken matches in the new four blocks that come to rest under the eliminator have probably already been eliminated by the time the blocks come to rest in registry with the eliminator and will certainly be eliminated before the next forward movement of the hopper.

The new blocks brought to the auxiliary hopper may usually already be completely charged with matches, but one or more of the groove seats of the blocks may be empty. The matches immediately overlying the shutter at the auxiliary hopper will settle when the shutter is retracted on to the matches already present in the underlying groove seats of the conveyor and into any empty groove seats thereof. The match discharge mechanism at the packeting machine will normally operate at this time and retract before the conveyor again starts forward.

After the shutters have retracted and a very short additional period of time has elapsed during which the matches settle downwardly into the groove seats beneath the main hopper, both shutters start forward, advancing the lifter mechanisms at the respective shutters, the serrated and chisel edge of each shutter coming to rest in engagement with and near the bottom of the heads of the matches immediately overlying those in the groove seats of the conveyor blocks beneath the hoppers.

The advancing shutters then lift the lifter mechanism sufficiently to permit easy entry of the correspondingly serrated and downwardly sloping edge of the shutters, the plates moving in over the conveyor blocks and across the bottoms of the hoppers, leaving the blocks beneath the hoppers charged with matches and ready for the next forward step.

During the advance of the shutters both shutters are preferably vibrating, the vibration being synchronized to provide more easy lifting of the match head ends of the matches preparatory to the actual entry of the shutters into the space above the conveyor blocks.

After the shutters come to rest in closed position the conveyor again advances forward one step a distance equal to the length of four blocks and the cycle repeats exactly as described at the broken match eliminator and also at the auxiliary hopper but the shutter at the main hopper remains closed for the next complete cycle at the eliminator and at the auxiliary cycle, each cycle at the main hopper covering two cycles at the conveyor, at the eliminator and at the auxiliary hopper.

The longer period of shutter closure at the main hopper permits more sure feed of matches into the one-match wide spaces above the shutter so that at the end of the next cycle for the conveyor and for the broken match eliminator and for the auxiliary hopper the matches are more surely ready for downward delivery from the main hopper.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. The match packeting mechanism, a hopper, an endless conveyor having intermediate periods of rest and movement and having transverse groove match seats adapted to register directly beneath bottom outlets from the hopper during a rest period of the conveyor and a horizontal slide adapted to reciprocate into and out from between the grooves of the conveyor and the bottom of the hopper, means for moving the conveyor, means for moving the slide, and means interposed between means for moving the conveyor and the means for moving the slide, holding the slide in closed position across the outlet opening at the bottom of the hopper during periods of intermittent motion of the conveyor and leaving the discharge outlet open during the intermittent periods of stopping of the conveyor.

2. In match packeting mechanism, a hopper for holding matches with the head ends directed to one side and the shank ends directed to the other side of the hopper, a match conveyor directly below the hopper movable intermittently in a path transverse to the length of the matches and adapted to downwardly close the hopper during each rest period of the conveyor and a cut-off slide movable longitudinally of the matches into and out from the space between the conveyor and the bottom of the hopper during rest periods of the conveyor, the said slide entering and leaving the said space at the match-head-end side of the hopper.

3. In match packeting mechanism, a hopper, an endless conveyor having intermediate periods of rest and movement and having transverse groove match seats adapted to register directly beneath bottom outlets from the hopper during a rest period of the conveyor and a horizontal slide adapted to reciprocate into and out from between the grooves of the conveyor and the bottom of the hopper, the said slide having a serrated forwardly presented edge with the indentations thereof during each advance of the slide registering vertically below the bottom outlets from the hopper.

4. In match packeting mechanism, a hopper for holding matches with the head ends directed to one side and the shank ends directed to the other side of the hopper, a match conveyor directly below the hopper movable intermittently in a path transverse to the length of the matches and adapted to downwardly close the hopper during each rest period of the conveyor and a cut-off slide movable longitudinally of the matches into and out from the space between the conveyor and the bottom of the hopper during rest periods of the conveyor, the said slide entering and leaving the said space at the match-head-end side of the hopper and the slide having a serrated forwardly presented edge to engage the matches in the indentations of the serrations.

5. In match packeting mechanism, a hopper, a match conveyor directly below the hopper, the conveyor having intermediate periods of rest and movement, a slide movable in a direction longitudinally of the matches and transversely of the path of movement of the conveyor to reciprocate into and out from between the conveyor and the bottom of the hopper and downwardly closing the hopper during the advancing movements of the conveyor, and means for vertically vibrating the slide as it makes a separating engagement of the ends of matches respectively in the conveyor and in the hopper.

6. In match packeting mechanism, a hopper, an endless conveyor having intermediate periods of rest and movement and having transverse groove match seats adapted to register directly beneath bottom outlets from the hopper during a rest period of the conveyor and a horizontal slide adapted to reciprocate into and out from between the grooves of the conveyor and the bottom of the hopper, the said slide having a serrated forwardly presented edge with the indentations thereof during each advance of the slide registering vertically below the bottom outlets from the hopper, and means for vertically vibrating the plate as it separates the ends of the matches in the outlets from those in the groove seats.

7. In match packeting mechanism, a hopper for holding matches with the head ends directed to one side and the shank ends directed to the other side of the hopper, a match conveyor directly below the hopper movable intermittently in a path transverse to the length of the matches and adapted to downwardly close the hopper during each rest period of the conveyor and a cut-off slide movable longitudinally of the matches into and out from the space between the conveyor and the bottom of the hopper during rest periods of the conveyor, the said slide entering and leaving the said space at the match-head-end side of the hopper and having a serrated forwardly presented edge to engage the matches in the indentations of the serrations, and means for vertically vibrating the plate as it separates the ends of matches in the hopper from those of matches on the conveyor.

8. In a match packeting mechanism, a multi-section hopper, the sections thereof succeeding one another in a direction laterally of the matches and having vertical divisions of one-match width open downwardly and an endless conveyor comprising blocks individual to the sections of the hopper and each having upwardly directed groove seats directly beneath the hopper to register with downwardly directed divisions of the hopper, the downwardly directed divisions of the hopper section including one for each of the upwardly directed groove seats on the block individual to the section and the said mechanism including means adapting all the groove seats on each conveyor block to be charged from its individual hopper during a single rest period of the conveyor with the block in registry with its said hopper section.

9. In match packeting mechanism, a hopper, vertical division plates dividing the bottom portions thereof into division outlets having walls and of one-match width, mechanism for vertically oscillating the division plates, an endless conveyor directly beneath the hopper having a path of intermittent movement transverse to the walls of division and upwardly directed groove match seats adapted to register with the bottoms of the divisions during a rest period of the conveyor and a cut-off plate adapted to move inwardly between the matches on the conveyor and overlying matches in the divisions during a rest period of the conveyor preparatory to an advance of the conveyor and to retract when the conveyor again comes to rest; means for moving the conveyor, means for moving the cut-off plate and means interposed between the means for moving the conveyor and the means for moving the cut-off plate, holding the cut-off plate in closed position across the division outlets at the bottom of the hopper during the periods of intermediate motion of the conveyor and leaving the division outlets open during the intermediate periods of stopping of the conveyor.

10. In match packeting mechanism, a hopper, vertical division plates dividing the bottom portions thereof into divisions of one-match width and a vertical corner on the upper edge of each plate near but spaced from the match-head-end side of the hopper to enter before other portions of the plate between downwardly approaching matches and near the match head ends thereof.

11. In match packeting mechanism, a hopper, vertical division plates dividing the bottom portions thereof into divisions of one-match width, a vertical corner on the upper edge of each plate near but spaced from the match-head-end side of the hopper to enter before other portions of the plate between downwardly approaching matches and near the match head ends thereof, and mechanism for vertically oscillating the division plates.

12. In match packeting mechanism, a hopper, a match conveyor directly below the hopper, the conveyor having intermediate periods of rest and movement, a slide movable in a direction longitudinally of the matches and transversely of the path of movement of the conveyor to reciprocate into and out from between the conveyor and the bottom of the hopper and downwardly closing the hopper during the advancing movements of the conveyor, and means for vertically vibrating the slide as it separates the ends of matches in hopper from underlying matches on the conveyor, said means comprising a vibrator under the slide, spring means pressing the vibrator downwardly and a cam jumping the vibrator upwardly against the spring and operative as the slide enters between the hopper and conveyor.

13. In a match hopper, a composite division wall for guiding matches to divisions of the hopper at opposite sides of the wall and including plates at the top and sides of the wall and means for vertically vibrating the top plate and laterally vibrating the side plates.

14. In a match hopper, a composite division wall for guiding matches to divisions of the hopper at opposite sides of the wall and including a vertically movable vertical plate having a range of vertical movement, a stationary plate on each side of and adjacent the movable plate, the stationary plates having upper edges lower than the upper edge of the movable plate when the latter plate is at a high part of its range of movement and having lateral openings to the movable plate, lateral agitators in the said openings vertically supported by the stationary plates and having operating connection with the movable plate, and means for moving the vertical plate up and down along its range of movement.

15. Mechanism in accord with claim 14 characterized by the agitators including springs fastened at one end to the adjacent stationary plate, pressing the agitator at its other end into the movable plate and the movable plate presenting recesses to the agitators when in one part of its range of movement.

16. In a match hopper, a composite division wall for guiding matches to divisions of the hopper at opposite sides of the wall and including a thin vertical plate, means for vertically oscillating the plate, stationary plates upon opposite sides of the movable plate and lateral agitators vertically positioned by the stationary plates and laterally positioned variantly at one end thereof by the movable plate.

17. Mechanism of claim 16 characterized by the movable plate extending above the stationary plates and being provided with an upper edge downwardly relieved at one end to avoid engaging the heads of overlying matches and sloping strongly upwardly from the other end so as to first engage the overlying matches near to the heads thereof.

18. In mechanism of the character indicated, an intermittently movable match conveyor including a series of blocks having a succession of transverse groove match seats across their outwardly directed faces, a guide for causing the blocks to travel along a predetermined path and casing the ends of the grooves, means for filling the grooves with matches at one part of the path and a broken match eliminator located over a subsequent part of the path and comprising a downwardly directed suction box having walls over the ends of the grooves to prevent escape of full length matches into the box.

19. In mechanism of the character indicated, an intermittently movable match conveyor including a series of blocks having a succession of transverse groove match seats across their outwardly directed faces, means for charging the grooves with matches at one part of the path of the conveyor and a broken match eliminator located at a subsequent part of the path and including a suction box over the grooves of the underlying portion of the conveyor and means at and over the ends of the groove seats preventing passage of full length matches out of the grooves into the suction box.

20. In mechanism of the character indicated, an intermittently movable match conveyor including a series of blocks having a succession of transverse groove match seats across their outwardly directed faces, a guide for causing the blocks to travel along a definite path, a match hopper above one part of the path, the said hopper having divisions registering with the groove seats of the underlying portion of the conveyor during the rest periods thereof, a shutter to move between matches in the grooves of the conveyor and overlying matches in the hopper and lifter mechanism for raising matches of the hopper overlying the matches in the grooves to provide a path for the entry of the shutter.

21. Mechanism of claim 20 characterized by the lifter including a plate with a forwardly directed serrated edge and the projections thereof registering intermediate the matches of the grooves and means for moving the lifter plate inwardly with the formed edge of the shutter to register the said projections between and against the heads of the lateral adjacent overlying matches and the lifter plate lifting at the said edge in contact with the match heads to lift the matches at their head ends preparatory to the entry of the shutter.

22. Mechanism of claim 20 characterized by the lifter including a plate with a forwardly directed edge and an upward offset rearward of the edge adapted to lead the shutter plate in substantially the plane thereof until the lifter plate enters into engagement with the matches at the head ends thereof and then to be lifted to lift the head ends of the matches in order to pass the shutter inwardly between underlying matches in the grooves and the lifted overlying matches in the hopper.

23. Mechanism of claim 20 characterized by the lifter including a plate with a forwardly directed edge to be ahead of the forward edge of the shutter at the beginning of each forward stroke thereof, means limiting the range of horizontal movement of the lifter and a friction connection between the shutter and the lifter mechanisms adapting the beginning of each stroke of the shutter to carry the lifter to the forward end of its stroke preparatory to the entry of the shutter between the under and overlying matches.

24. Mechanism of claim 20 characterized by the lifter including a plate with a forwardly directed edge to be ahead of the forward edge of the shutter at the beginning of each forward stroke thereof, laterally spaced springs rearwardly extending from and carrying and normally downwardly pressing the lifter plate, a horizontal slide positioning the springs, a friction connection between the shutter and the slide and means limiting the horizontal movement of the lifter plate.

25. In mechanism of the character indicated, a main hopper, an auxiliary hopper, an intermittently movable conveyor having portions of its length passing under both hoppers and in its rest positions presenting transverse groove match seats in registry with match divisions of the respective hoppers and shutters at the respective hoppers closing the divisions of the hoppers from the groove seats of the conveyor during periods of conveyor movement adapted to retract during rest periods of the conveyor for downward feeding of matches out of the divisions into the groove seats, and subsequently to advance during the same rest periods for the separation of the matches of the hoppers from the conveyor.

26. In mechanism of the character indicated, a main hopper, an auxiliary hopper, an intermittently movable conveyor having portions of its length passing both hoppers and in its rest positions presenting transverse groove seats in registry with match divisions of the respective hoppers, means operative at the respective hoppers for delivering matches from the divisions into any of the grooves registering therewith and without matches and a broken match eliminator intermediate the hoppers.

27. In a match packeting mechanism, a hopper, a plurality of vertical division plates dividing the bottom portions thereof into subdivisions of one match width, the central division plates being lower than the side division plates and adjoining plates increasing in height progressively toward the walls of the hopper, and mechanism for oscillating the division plates.

28. In a match hopper, a composite division wall, comprising flexible plates centered between cam plates for guiding matches to divisions within the hopper.

29. In a match hopper, a composite division wall, comprising flexible plates centered between cam plates for guiding matches to divisions within the hopper, the cams being shaped to compensate for the fanning of the matches caused by the difference in the sizes of the stick ends of the matches and the head ends, and mechanism for agitating the cam shaped hopper walls.

RODNEY S. PULLEN.